United States Patent
Mizuta et al.

(10) Patent No.: US 12,204,343 B2
(45) Date of Patent: Jan. 21, 2025

(54) PROBE CAR DATA TRANSMISSION REDUCTION

(71) Applicant: International Business Machines Corporation, Armonk, NY (US)

(72) Inventors: Hideyuki Mizuta, Tokyo (JP); Gaku Yamamoto, Machida (JP)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 17/109,707

(22) Filed: Dec. 2, 2020

(65) Prior Publication Data
US 2022/0171406 A1    Jun. 2, 2022

(51) Int. Cl.
| G05D 1/00 | (2024.01) |
| G01C 21/30 | (2006.01) |
| G01C 21/36 | (2006.01) |
| G07C 5/00 | (2006.01) |
| G08G 1/00 | (2006.01) |

(Continued)

(52) U.S. Cl.
CPC ........... *G05D 1/0293* (2013.01); *G01C 21/30* (2013.01); *G01C 21/3691* (2013.01); *G07C 5/008* (2013.01); *G08G 1/0108* (2013.01); *G08G 1/0125* (2013.01); *G08G 1/052* (2013.01); *G08G 1/205* (2013.01); *G08G 1/22* (2013.01)

(58) Field of Classification Search
CPC ...... G08G 1/22; G08G 1/0125; G08G 1/0133; G08G 1/205; G08G 1/0108; G08G 1/0129; G08G 1/0112; G08G 1/052; G08G 1/0104; G05D 1/0293; G07C 5/008; G01C 21/3691; G01C 21/30; G01C 21/3841
See application file for complete search history.

(56) References Cited

U.S. PATENT DOCUMENTS

| 9,459,106 B2 | 10/2016 | Konig |
| 9,467,839 B1 | 10/2016 | Nishimura et al. |
| 9,709,406 B2 | 7/2017 | Bastiaerisen et al. |

(Continued)

FOREIGN PATENT DOCUMENTS

| CN | 101046920 A | 10/2007 |
| CN | 101154318 A | 4/2008 |
| CN | 102314768 A | 1/2012 |

OTHER PUBLICATIONS

Tang et al., "Improving Coverage Rate for Urban Link Travel Time Prediction Using Probe Data in the Low Penetration Rate Environment", Sensors 2020, Jan. 2, 2020, 20 pages, <https://www.ncbi.nlm.nih.gov/pmc/articles/PMC6982698/pdf/sensors-20-00265.pdf>.

*Primary Examiner* — Bao Long T Nguyen
(74) *Attorney, Agent, or Firm* — Gavin Giraud

(57) ABSTRACT

An approach for reducing transmission of probe car data over a network is provided. The approach includes using a processor to receive, at one or more processors remote from a vehicle, a first set of probe car data for the vehicle, wherein the first set of probe car data comprises a trigger event from a first time. The processor determine that no additional set of probe car data is received during a second time interval. The processor also determines that a trigger event has not occurred during the second time interval based on the determination that no additional set of probe car data was received. The processor also estimates an estimated probe car data for the vehicle at the second time interval based on the first set of probe car data and a non-trigger assumption.

20 Claims, 4 Drawing Sheets

(51) Int. Cl.
  *G08G 1/01*      (2006.01)
  *G08G 1/052*     (2006.01)

(56) References Cited

U.S. PATENT DOCUMENTS

| | | | |
|---|---|---|---|
| 10,012,993 B1* | 7/2018 | Matus | B60W 50/0098 |
| 10,246,100 B2* | 4/2019 | Murray | B60W 30/12 |
| 10,752,075 B1* | 8/2020 | Shukla | B60G 17/052 |
| 11,148,664 B2* | 10/2021 | Finelt | G05D 1/0246 |
| 11,335,187 B2* | 5/2022 | Jonietz | G08G 1/0112 |
| 2005/0206534 A1 | 9/2005 | Yamane | |
| 2020/0066156 A1 | 2/2020 | Akiyama et al. | |
| 2021/0078584 A1* | 3/2021 | Janampally | B60W 30/143 |
| 2021/0291855 A1* | 9/2021 | Wang | B60W 30/18054 |

* cited by examiner

PROBE CAR DATA TRANSMISSION REDUCTION

BACKGROUND OF THE INVENTION

The present invention relates generally to the field of traffic tracking and prediction, and more particularly to using a trigger event to reduce the amount and frequency of transmitting probe car data through a network.

Probe car data includes location and speed data collected by vehicles as they are moving. Vehicle manufacturers are producing more and more cars with internal sensors such as global positioning system (GPS) units that collect probe car data. These vehicles can assist in determining traffic speed, congestion, accidents, or other incidents on the road. The vehicles may also transfer this information to a remote server that tracks traffic, calculates travel times, and generates traffic reports. The remote servers may use cellular network data to collect the probe car data from the vehicles. When cellular networks are used, every phone in traffic becomes a potential traffic probe and anonymous source of information. The location of each phone can be tracked, and algorithms used to extract high-quality data. This probe car data can thus be used without infrastructure or special hardware installed in the vehicles or along the road.

SUMMARY

In one embodiment, the present invention discloses a computer-implemented method for reducing transmission of probe car data over a network. The method includes receiving, at a server remote from a vehicle, a first set of probe car data for the vehicle, wherein the first set of probe car data comprises a trigger event from a first time. The method further includes detecting, at the server, that a second set of probe car data from a second time interval is not sent from the vehicle. The method further includes determining that the second set of probe car data does not comprise a trigger event. The method further includes estimating an estimated probe car data for the vehicle at the second time interval based on the first set of probe car data and a non-trigger assumption.

In another embodiment, the present invention provides a computer program product for reducing transmission of probe car data over a network. The computer program product includes one or more computer readable storage media and program instructions stored on the one or more computer readable storage media. The program instructions include program instructions to receive, at a server remote from a vehicle, a first set of probe car data for the vehicle, wherein the first set of probe car data comprises a trigger event from a first time. The program instructions also include program instructions to detect, at the server, that a second set of probe car data from a second time interval is not sent from the vehicle. The program instructions also include program instructions to determine that the second set of probe car data does not comprise a trigger event. The program instructions also include program instructions to estimate an estimated probe car data for the vehicle at the second time interval based on the first set of probe car data and a non-trigger assumption.

In another embodiment, the present invention provides a computer system for reducing transmission of probe car data over a network. The computer system includes one or more computer processors, one or more computer readable storage media, and program instructions stored on the computer readable storage media for execution by at least one of the one or more processors. The program instructions include program instructions to receive, at a server remote from a vehicle, a first set of probe car data for the vehicle, wherein the first set of probe car data comprises a trigger event from a first time. The program instructions also include program instructions to detect, at the server, that a second set of probe car data from a second time interval is not sent from the vehicle. The program instructions also include program instructions to determine that the second set of probe car data does not comprise a trigger event. The program instructions also include program instructions to estimate an estimated probe car data for the vehicle at the second time interval based on the first set of probe car data and a non-trigger assumption.

DETAILED DESCRIPTION

When probe car data is collected over a cellular network, the amount of data can be expensive and burdensome to transmit. The embodiments disclosed herein, therefore, selectively transmit the probe car data so that location, speed, acceleration, heading, or other data of vehicles can be tracked, estimated, or interpolated without requiring constant, continuous monitoring by a server over a network. The embodiments described herein rely on trigger events to determine when to send/receive the probe car data. The trigger events are selected so that the reduced data points still provide sufficient information for vehicle tracking.

Figure 1:
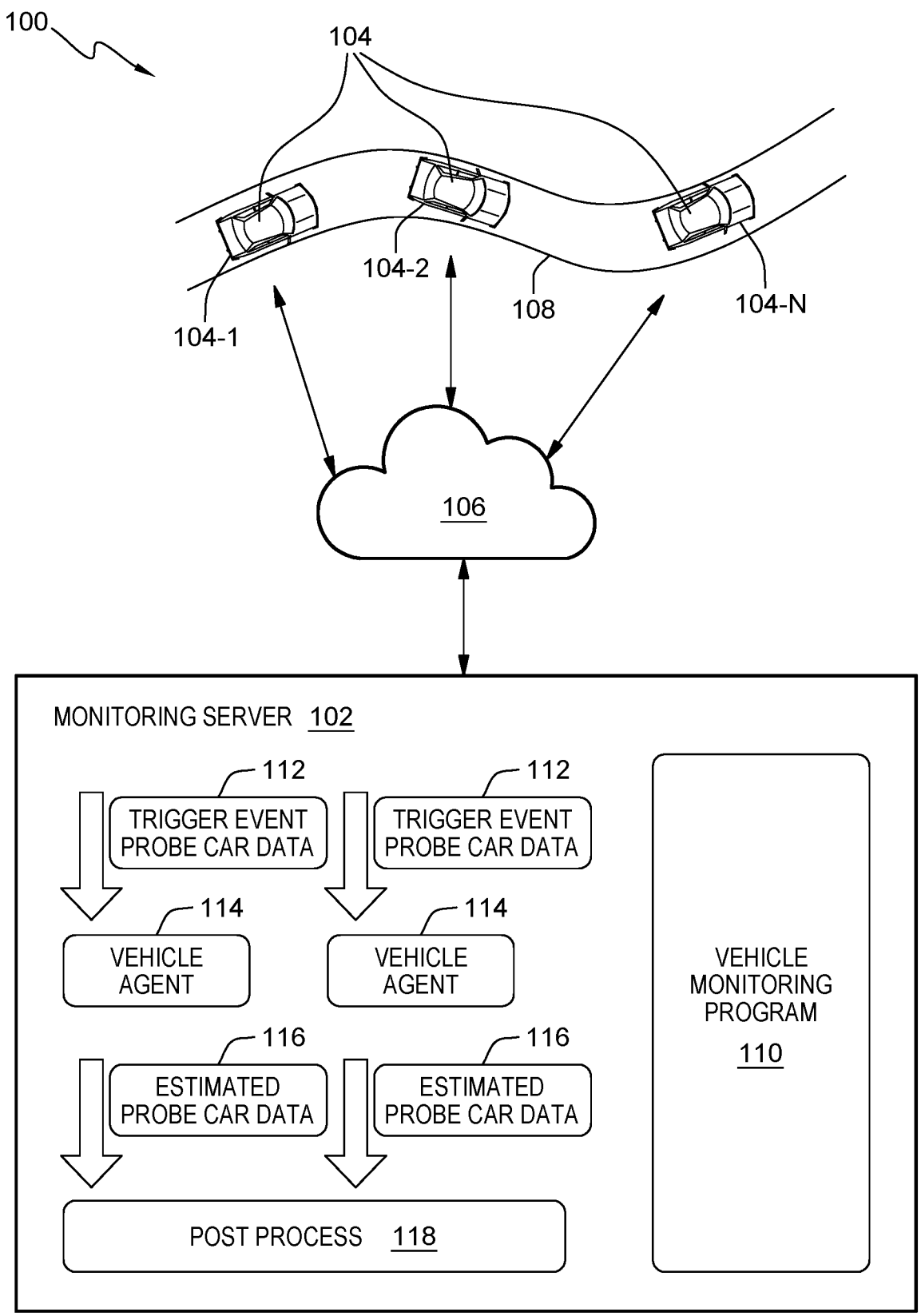
FIG. 1 depicts a diagram of a vehicle monitoring system in accordance with one embodiment of the present invention.

FIG. 1 depicts a diagram of a vehicle monitoring system 100 in accordance with one embodiment of the present invention. The system 100 includes a server 102 that connects to vehicles 104 (i.e., sensors/devices connected to a processor within the vehicles 104) over a network 106. The vehicles 104 include processors (CPUs) that receive and process signals from sensors in the vehicle 104-1 to determine conditions of the vehicle 104-1 and the surroundings. The processors are generally described herein as collectively part of the vehicle 104, and mentions of the vehicle 104-1 should be understood to include processors for processing sensors signals and sending data through the network 106.

The network 106 can be, for example, a telecommunications network, a local area network (LAN), a wide area network (WAN), such as the Internet, or a combination of the three, and can include wired, wireless, or fiber optic connections. The network 106 can include one or more wired and/or wireless networks that are capable of receiving and transmitting data, voice, and/or video signals, including multimedia signals that include voice, data, and video information. In general, the network 106 can be any combination of connections and protocols that will support communications between the monitoring server 102, and other computing devices such as the vehicles 104 within the vehicle monitoring system 100. In various embodiments, the network 106 operates locally via wired, wireless, or optical connections and can be any combination of connections and protocols (e.g., personal area network (PAN), near field communication (NFC), laser, infrared, ultrasonic, etc.). The monitoring server 102 may include any suitable computer structure for receiving and storing data. For example, the monitoring server 102 may include a computer readable storage medium (or media) having computer readable program instructions thereon for causing a processor to carry out aspects of the present invention.

The vehicles 104 include sensors to record and/or collect probe car data while driving along a roadway 108. The sensors may include GPS location devices, speedometers, odometers, clocks, accelerometers, compasses, pressure sensors, or other sensors to detect internal or external (i.e., environmental) conditions about the vehicle 104-1. The probe car data, therefore, includes current data for location, speed, distance, time, acceleration, heading, pressure, identification, or other information about the vehicle 104-1 that may be detected by sensors. The probe car data may also be detected by devices/sensors that are not directly installed within the vehicle. For example, a smartphone or standalone GPS device of a user riding inside the vehicle 104-1 may collect probe car data. For simplicity of explanation, this application will describe all devices that collect and send probe car data as the vehicle 104-1.

In addition to the sensor data, the vehicle 104-1 collects and/or calculates preprocessed data as part of the probe car data. For example, the vehicle 104-1 may take the detected location and match that location to an onboard map or to an identified road, so that the set of probe car data includes map-matched data or road-identified data. Additionally or alternatively, the vehicle 104-1 may measure a distance from a starting point and include this information in the set of probe car data. The vehicle 104-1 may collect the probe car data as a set of probe car data from all sensors and all calculations for a given time interval. The time interval may be customized to the driver, but is typically a short time interval of about one second. Other time intervals may be used in accordance with embodiments of the present invention. Once the set of probe car data is collected and/or preprocessed, the vehicles 104 include network connections that can transmit the set of probe car data to the network 106 and to the monitoring server 102.

The monitoring server 102 includes a vehicle monitoring program 110 that receives the set of probe car data, monitors conditions of the vehicles 104, and makes determinations about the roadway 108 based on the conditions. To accurately monitor the conditions, the vehicle monitoring program 110 may receive sets of probe car data that the vehicles 104 detect and preprocess. The short time interval between sets of probe car data, however, increases congestion on the network 106 and the cost of monitoring the roadway 108. To reduce strain on the network 106, the vehicle monitoring program 110 may receive probe car data only when a trigger event has occurred. That is, while the vehicle 104-1 may collect a set of probe car data every second, or other short-length time interval, the vehicle monitoring program 110 may only receive a set of trigger event probe car data 112 whenever a trigger event occurs at the vehicle 104-1. This reduces the amount of data that is transmitted over the network, which increases speed and reduces costs. The vehicle monitoring program 110 uses the trigger event probe car data 112 to store vehicle agents 114 representing the vehicles 104 and accompanying location, speed, heading, etc. on the monitoring server 102. As explained in detail below, the vehicle monitoring program 110 estimates estimated probe car data 116 for time intervals in which the vehicle monitoring program 110 has not received actual probe car data.

The trigger event probe car data 112 and the estimated probe car data 116 may be delivered to a post process program 118 that can be used to optimize the driver journey by managing fleet operations, monitoring driver behavior, streamlining car sharing, etc. Furthermore, the post process program 118 may anticipate vehicle failures by monitoring usage, fuel consumption, security, and in-car activities, to reduce maintenance of the vehicle 104-1. The post process program 118 may communicate back to drivers in the vehicle 104-1 to give them data that adds context and situational awareness and gives insight into movement and driving behavior for each vehicle 104. The post process program 118 may also evaluate real time interval data from multiple sources including, weather, geographic locations, traffic, social media and other data systems to derive wholistic models of the vehicle 104-1 and the roadway 108.

Figure 2:
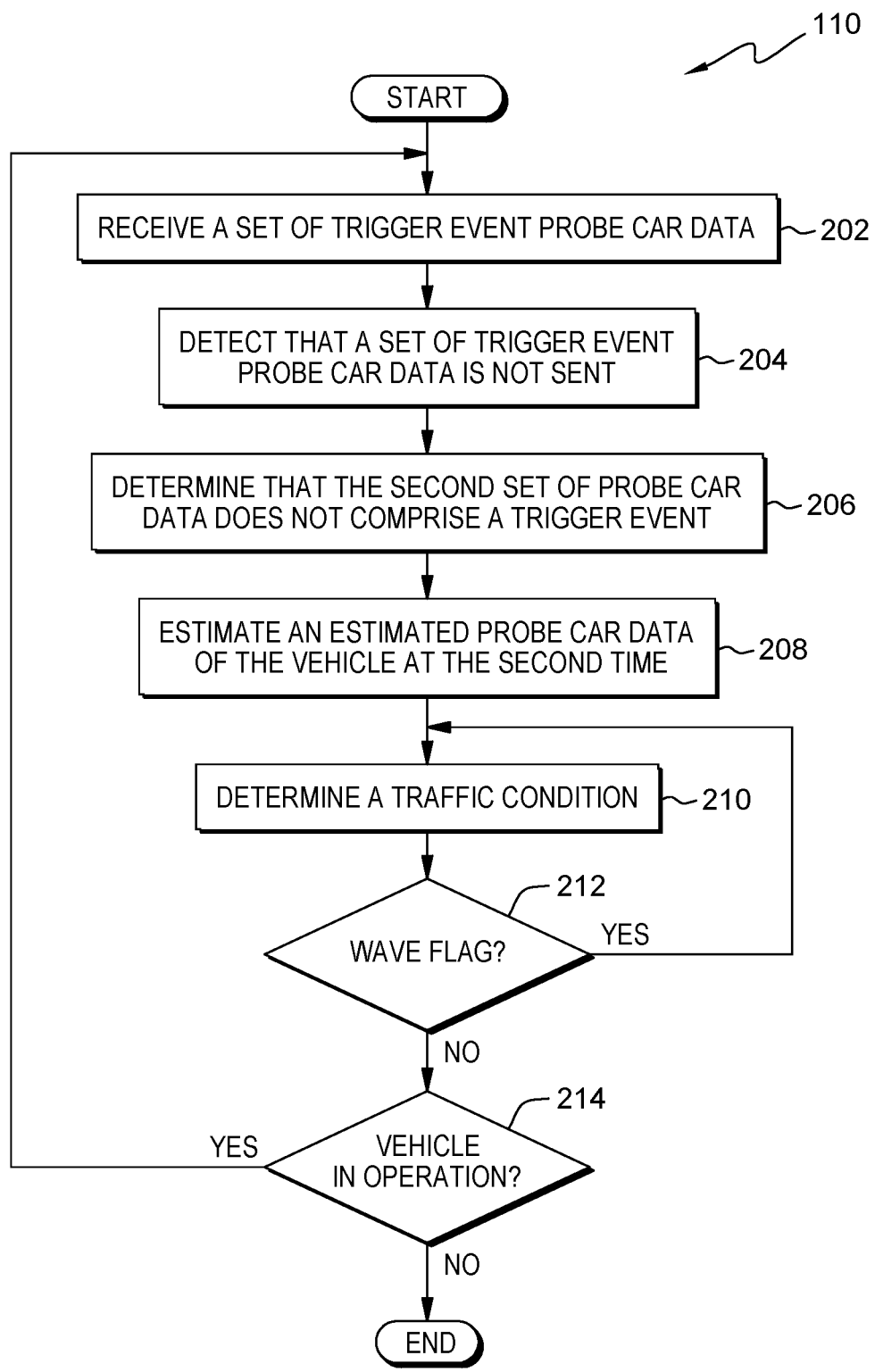
FIG. 2 depicts a flowchart of the steps of a vehicle sensor monitoring program executing within the system of FIG. 1, in accordance with one embodiment of the present invention.

FIG. 2 depicts a flowchart of the steps of the vehicle monitoring program 110 executing within the system 100 of FIG. 1, in accordance with one embodiment of the present invention. During operation of the system 100, the vehicle monitoring program 110 receives a first set of probe car data from one of the vehicles 104 (e.g., vehicle one 104-1) over the network 106 (block 202). The first set of probe car data includes a set of trigger event probe car data 112 from a first time interval having a trigger event and the other sensor data that the vehicle 104-1 has detected. The vehicle 104-1 will not send a set of probe car data to the network 106 without experiencing a trigger event. Trigger events are conditions detected by the vehicle 104-1 that are predefined for triggering the transmission of the probe car data. Such conditions may be categorized as a "global event" or a "prompt event."

Global events may include events that can detect triggering differences between two probe car data over a long time interval. For example, if an angle of the roadway 108 changes by one degree over one second, the one degree change will not cause the vehicle 104-1 to send trigger event probe car data 112. If the roadway 108 continues to change by one degree per second for 30 seconds, however, then the vehicle 104 recognizes a significant change of 30 degrees and triggers a global event and the transmission of trigger event probe car data 112. The vehicle 104-1 will also trigger a global event after the expiration of a predefined duration. The prompt events are detected more immediately, with only the prompt data (e.g., current differentiation of the acceleration). For example, the vehicle 104-1 may monitor an absolute value of a difference of acceleration between two successive time intervals to determine whether the difference is larger than an acceleration trigger threshold.

Figure 3:
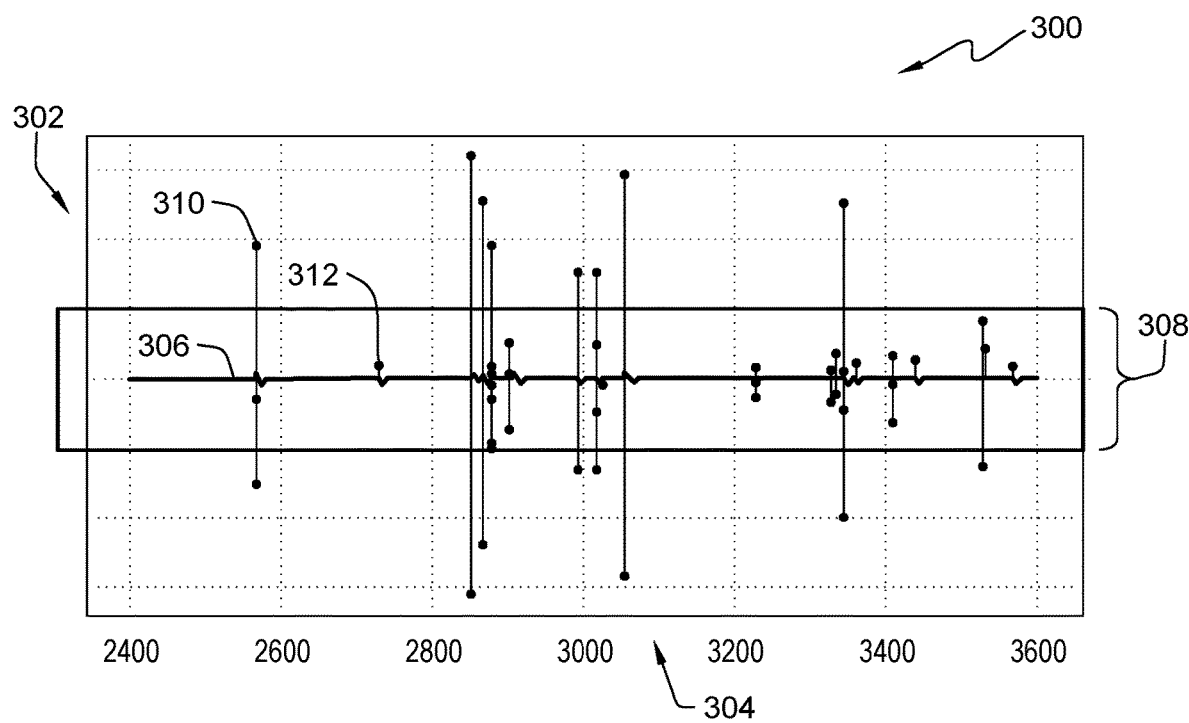
FIG. 3 depicts a graph of acceleration change over time interval of a vehicle within the system of FIG. 1, in accordance with one embodiment of the present invention.

FIG. 3 depicts a graph 300 of differentiation of acceleration 302 over time interval 304 of a vehicle 104 within the system 100 of FIG. 1, in accordance with one embodiment of the present invention. The vehicle 104-1 tracks a current differentiation of acceleration 306 and compares the current differentiation of acceleration 306 with a threshold 308. If the absolute value of the current differentiation of acceleration 306 is detected outside of the threshold 308 (e.g., at time interval 310), then the vehicle 104-1 recognizes a trigger event, and a set of trigger event probe car data 112 will be sent to the network 106, and received by the vehicle monitoring program 110. Acceleration changes that are not outside of the threshold 308 (e.g., at time interval 312) will not trigger transmission of trigger event probe car data 112. Similar tracking may be maintained for speed, heading, or other sensor data that could indicate a trigger event. The thresholds may be programmed from known general operating conditions, and may be customized based on the type of car, driving habits of a driver, the characteristics of the roadway 108, or other particulars pertaining to a certain vehicle 104.

Referring back to FIG. 2, the vehicle monitoring program 110 monitors the vehicles 104 for incoming signals, and detects that a second set of probe car data from a second time interval is not sent from the vehicle 104-1 (block 204). The vehicle monitoring program 110 may have a minimum wait time interval before which the vehicle monitoring program 110 will not receive a set of probe car data. The minimum wait time interval may be short (e.g., the time interval for collection of the probe car data: 1.5 to 2 seconds), however, and the expiration thereof enables the vehicle monitoring program 110 to detect the absence of the second set of probe car data and determine that the second set of probe car data does not comprise a trigger event (block 206).

In the absence of receiving the second set of probe car data, the vehicle monitoring program 110 estimates an estimated probe car data 116 for the vehicle 104-1 (block 208). Estimating the estimated probe car data 116 includes using the trigger event probe car data 112 and non-trigger assumption (i.e., that a trigger event has not occurred at the second time interval). This means, for example, that a heading angle, speed, acceleration, etc. have not changed more than is allowed by the heading threshold and/or the speed threshold. In certain embodiments, the vehicle monitoring program 110 estimates a changing acceleration, the absolute value of which is not outside the threshold. For example, if the acceleration increases from zero and triggers transmission of trigger event probe car data 112, the vehicle monitoring program 110 calculates a current acceleration using a constant rate of decay. That is, the vehicle monitoring program 110 is programmed to recognize that as the vehicle 104-1 approaches the cruising speed, the acceleration of the vehicle 104-1 will decrease, and a constant rate of decay has been found to accurately measure the behavior of many vehicles 104.

Figure 4:
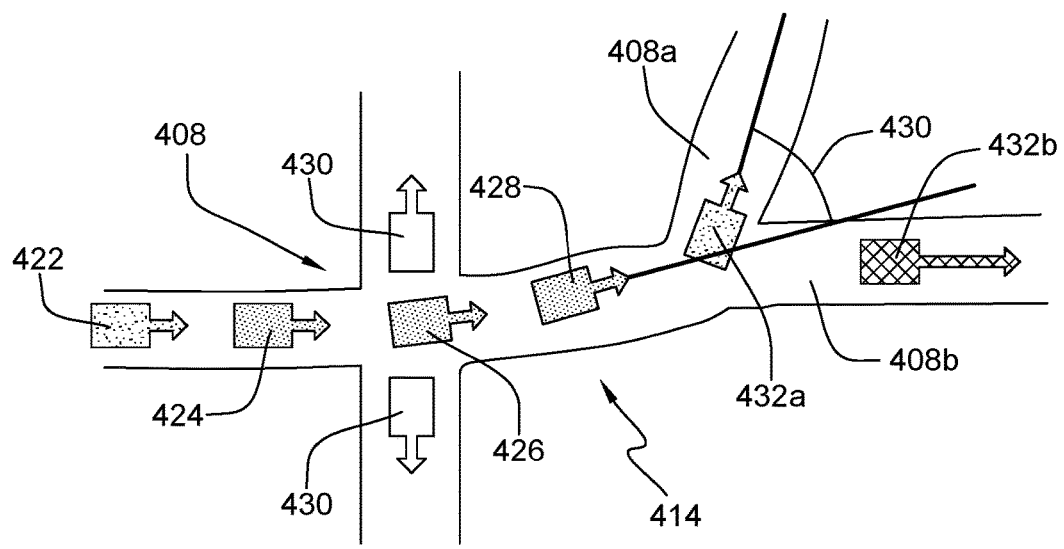
FIG. 4 depicts a schematic representation of vehicle agents mapped to a roadway, in accordance with one embodiment of the present invention.

FIG. 4 depicts a schematic representation of vehicle agents 414 mapped to a roadway 408 in accordance with one embodiment of the present invention. The schematic representation does not necessarily reflect actual implementation of vehicle agents by all embodiments, but is merely an example for illustrative purposes of this application. In the illustrated embodiment, the vehicle monitoring program 110 receives a trigger event probe car data for a first time interval. The trigger event probe car data includes (among other potential data) a location, heading angle, and speed graphically represented (for illustrative purposes of this application, only) as a first vehicle agent 422 with a position relative to the roadway, an arrow direction, and an arrow length, respectively. At a second time interval, the vehicle monitoring program 110 does not receive trigger event probe car data, and uses the trigger event probe car data (represented by first vehicle agent 422) and a non-trigger assumption that the heading angle and speed are within the associated threshold to estimate an estimated probe car data (represented by second vehicle agent 424). Similarly, the vehicle monitoring program 110 does not receive trigger event probe car data for a third time interval or a fourth time interval, and estimates an estimated probe car data (represented by a third vehicle agent 426 and a fourth vehicle agent 428).

The vehicle monitoring program 110 may estimate the estimated probe car data by eliminating potential paths based on the configuration of the roadway 408. That is, the vehicle monitoring program 110 may recognize alternative paths (represented by hypothetical vehicle agents 430) but eliminates these paths due to the requisite heading change and subsequent reception of trigger event probe car data that would accompany the vehicle 104-1 traveling the alternative path at the third time interval. Since the vehicle monitoring program 110 did not receive trigger event probe car data, then the vehicle monitoring program 110 estimates a straight course for the vehicle (i.e., third vehicle agent 426 and fourth vehicle agent 428).

FIG. 4 illustrates two options for trigger events that could occur at a fifth time. One option is that the vehicle 104-1 takes a slight left along the left fork 408a. The vehicle 104-1 sends trigger event probe car data due to the heading change 430 between the fourth heading (i.e., of fourth vehicle agent 428) and the fifth heading (i.e., of fifth vehicle agent 432a) being greater than a threshold. The vehicle monitoring program 110 therefore does not estimate probe car data, but records the probe car data as vehicle agent 432. A second option illustrated in FIG. 4 is that the vehicle 104-1 takes the straighter path along the right fork 408b, but still sends trigger event probe car data due to a change in speed that is over the threshold. If the vehicle 104-1 took this option at the fourth time interval, the vehicle monitoring program 110 would represent the vehicle 104-1 as vehicle agent 432b.

Certain embodiment of the present invention may also include interpolating probe car data rather than estimating in advance. Interpolation by the vehicle monitoring program 110, in the context of FIG. 4, includes waiting between the first time interval (vehicle agent 422) and the fifth time interval (vehicle agents 432a, 432b). When the trigger event probe car data is received at the fifth time interval, then the vehicle monitoring program 110 interpolates the possible probe car data that is most likely to have occurred between the first time interval and the fifth time interval. In the illustrated example, the hypothetical vehicle agents 430 are eliminated due to the unlikelihood that the vehicle 104-1 could make either turn indicated by the hypothetical vehicle agents 430 and return to the received position by the fifth time interval. Therefore, the vehicle monitoring program 110 interpolates that the vehicle 104-1 traveled the roadway as indicated by vehicle agents 424, 426, and 428.

In certain embodiments, the vehicle monitoring program 110 may determine a traffic condition along with estimating probe car data for the vehicles 104 along the roadway 108 (block 210). Determining a traffic condition may be based on the trigger event probe car data, or from the estimated probe car data estimated by the vehicle monitoring program 110. For example, if one or multiple cars experience a change in acceleration at a location on the roadway 108 that usually does not have such a change in acceleration, the vehicle monitoring program 110 may determine that an accident has occurred at the location, or there is an obstruction in the road, or some other event has occurred. If there is regular deceleration by many vehicle 104 along a stretch of the roadway 108, the vehicle monitoring program 110 may determine that an obstruction, such as a pothole, crack, or bump has developed at the stretch. Similarly, a temporary obstruction such as debris on the road may be determined based on the probe car data received by the vehicle monitoring program 110. The vehicles 104 may assist in determining a traffic condition by sending a wave flag (indicating a wave-like speed and/or motion of traffic) rather than trigger event probe car data. That is, if the vehicle 104-1 encounters traffic congestion along the roadway 108, the vehicle 104-1 may stop relying on a trigger event to send the probe car data, and may instead periodically send a wave flag along with the current position of the vehicle 104-1. The vehicle monitoring program 110 determines whether there is a wave flag (block 212), and if yes then the vehicle monitoring program 110 determines that a road condition includes traffic congestion (block 212, "Yes"). For vehicles 104 sending wave flags, the vehicle monitoring program 110 may not estimate estimated probe car data 116 at all, instead only tracking the congestion of the roadway 108. If the vehicle monitoring program 110 does not receive a wave flag (block 212, "No"), then the vehicle monitoring program 110 determines whether the vehicle 104-1 is still operating. If the vehicle 104-1 is still operating (block 214, "Yes"), then the vehicle monitoring program 110 receives a further set of trigger event probe car data. If the vehicle 104-1 is not operating (block 214, "No"), then the method used by the vehicle monitoring program 110 ends until a subsequent iteration.

Figure 5:
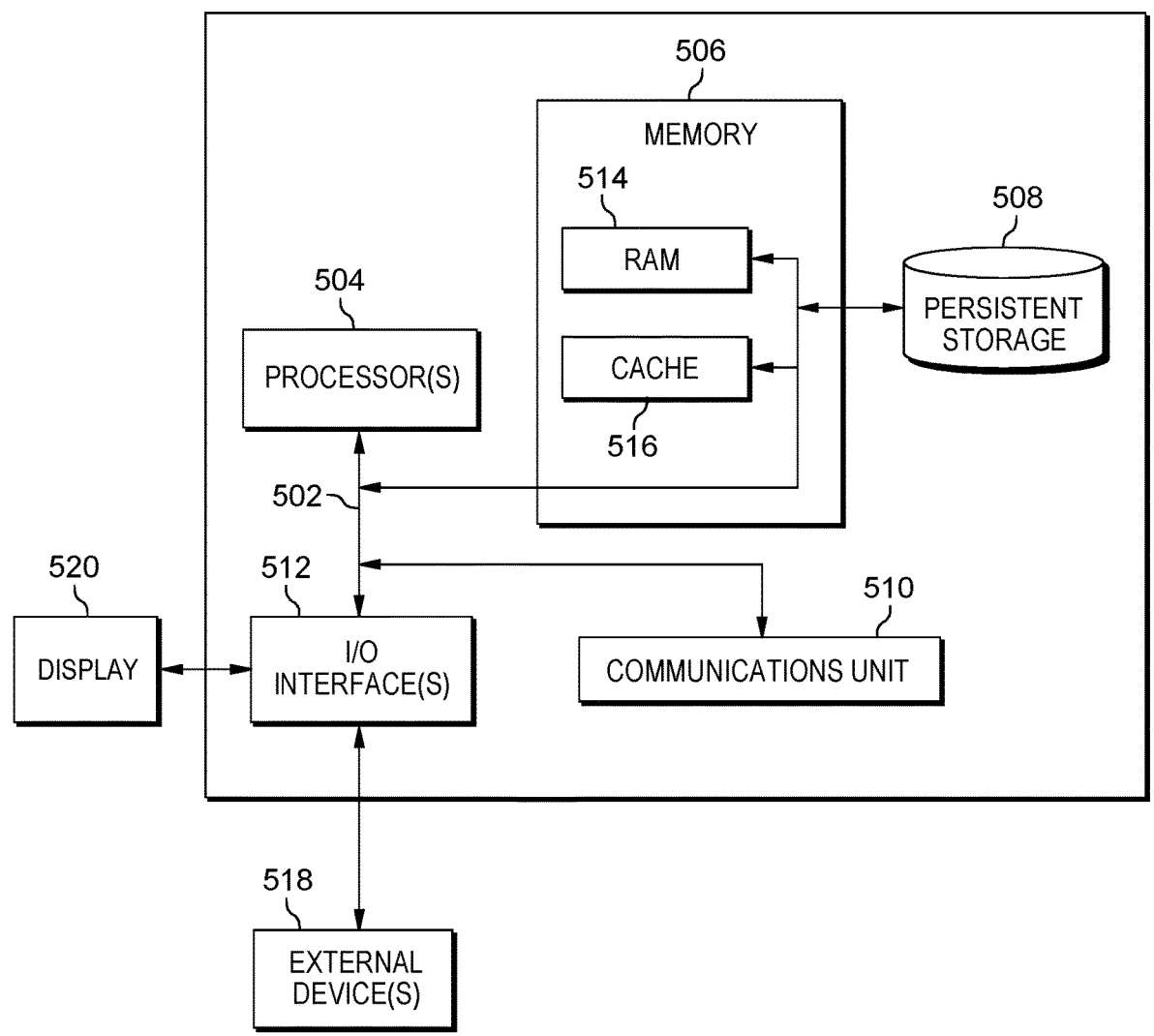
FIG. 5 depicts a block diagram of components of the monitoring server and the vehicles in accordance with an illustrative embodiment of the present invention.

FIG. 5 depicts a block diagram of components of the monitoring server 102 and the vehicles 104 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

The monitoring server 102 and the vehicles 104 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

The vehicle monitoring program 110 is stored in persistent storage 508 of the monitoring server 102 for execution and/or access by one or more of the respective computer processors 504 of the monitoring server 102 via one or more memories of the memory 506 of the monitoring server 102. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing computer readable program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. The vehicle monitoring program 110 may be downloaded to persistent storage 508 of the monitoring server 102 through communications unit 510 of the monitoring server 102.

I/O interface(s) 512 allows for input and output of data with other devices that may be connected to the monitoring server 102 and/or the vehicle 104-1. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., the vehicle monitoring program 110, can be stored on such portable computer readable storage media and can be loaded onto persistent storage 508 of the monitoring server 102 via I/O interface(s) 512 of the monitoring server 102. Software and data used to practice embodiments of the present invention, can be stored on such portable computer readable storage media and can be loaded onto persistent storage 508 of the vehicle 104-1 via I/O interface(s) 512 of the vehicle 104-1. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   receiving, by one or more processors remote from a vehicle traveling on a roadway, a first set of probe car data for the vehicle over a network, wherein the first set of probe car data comprises a trigger event from a first time interval;
   determining that no additional set of probe car data is received during a second time interval;
   reducing transmission of monitoring signals over the network based on the determination of no additional set of probe car data being received during the second time interval;
   assuming a non-trigger assumption for the second time interval based on an absence of receiving an additional set of probe car data; and
   estimating an estimated probe car data for the vehicle at the second time interval based on the first set of probe car data, a configuration of the roadway, and the non-trigger assumption, wherein the estimated probe car data includes a change in heading angle, speed and acceleration that are less than a threshold.

2. The method of claim 1, wherein the first set of probe car data comprises a selection from the group consisting of: location, speed, time, heading, and vehicle identification (ID).

3. The method of claim 1, wherein the first set of probe car data comprises preprocessed data selected from the group consisting of: map-matched data, road-identified data, and a distance measured from a starting point.

4. The method of claim 1, wherein the first set of probe car data comprises a first heading angle and a first speed, and wherein the non-trigger assumption comprises a selection from the group consisting of: a current heading that is within a heading threshold from the first heading and a current speed that is within a speed threshold from the first speed.

5. The method of claim 1, wherein estimating the estimated probe car data for the vehicle at the second time interval comprises calculating a current acceleration using a constant rate of decay for acceleration.

6. The method of claim 1, comprising:
receiving a wave flag and a location of the vehicle at a third time interval, wherein the wave flag comprises an indication of wave-like motion of traffic; and
in response to receiving the wave flag, determining that a road condition comprises traffic congestion without estimating estimated probe car data for the third time interval.

7. The method of claim 1, comprising:
receiving a third set of probe car data for the vehicle, wherein the third set of probe car data comprises a trigger event from a third time; and
interpolating a location of the vehicle at the second time interval based on the first set of probe car data and the third set of probe car data.

8. The method of claim 1, wherein the trigger event comprises an absolute value of a difference of acceleration between two successive time intervals that is larger than an acceleration trigger threshold.

9. The method of claim 1, wherein estimating the estimated probe car data for the vehicle at the second time interval comprises:
calculating an estimated distance traveled by the vehicle since the first time interval;
calculating an estimated heading range of the vehicle, wherein the estimated heading range comprises a current heading and a heading threshold within which the vehicle will not trigger a trigger event; and
comparing the estimated distance traveled and the estimated heading range to map data stored on a remote server.

10. A computer program product for reducing transmission of probe car data, the computer program product comprising:
one or more computer readable storage media and program instructions collectively stored on the one or more computer readable storage media, the program instructions comprising:
program instructions to receive, by one or more processors remote from a vehicle traveling on a roadway, a first set of probe car data for the vehicle over a network, wherein the first set of probe car data comprises a trigger event from a first time;
program instructions to determine that no additional set of probe car data is received during a second time interval;
program instructions to reduce transmission of monitoring signals over the network;
program instructions to assume a non-trigger assumption for the second time interval based on an absence of receiving an additional set of probe car data; and
program instructions to estimate an estimated probe car data for the vehicle at the second time interval based on the first set of probe car data, a configuration of the roadway, and the non-trigger assumption, wherein the estimated probe car data includes a change in heading angle, speed and acceleration that are less than a threshold.

11. The computer program product of claim 10, wherein the first set of probe car data comprises a selection from the group consisting of: location, speed, time, heading, and vehicle identification (ID).

12. The computer program product of claim 10, wherein the first set of probe car data comprises preprocessed data selected from the group consisting of: map-matched data, road-identified data, and a distance measured from a starting point.

13. The computer program product of claim 10, wherein the first set of probe car data comprises a first heading angle and a first speed, and wherein the non-trigger assumption comprises a selection from the group consisting of: a current heading that is within a heading threshold from the first heading and a current speed that is within a speed threshold from the first speed.

14. The computer program product of claim 10, wherein estimating the estimated probe car data for the vehicle at the second time interval comprises calculating a current acceleration using a constant rate of decay for acceleration.

15. The computer program product of claim 10, comprising:
program instructions to receive a wave flag and a location of the vehicle at a third time interval, wherein the wave flag comprises an indication of wave-like motion of traffic; and
program instructions to, in response to receiving the wave flag, determine that a road condition comprises traffic congestion without estimating estimated probe car data for the third time interval.

16. The computer program product of claim 10, wherein estimating the estimated probe car data for the vehicle at the second time interval comprises:
program instructions to calculate an estimated distance traveled by the vehicle since the first time interval;
program instructions to calculate an estimated heading range of the vehicle, wherein the heading range comprises a current heading plus or minus a heading threshold within which the vehicle will not trigger a trigger event; and
program instructions to compare the estimated distance traveled and the estimated heading range to map data stored on a remote server.

17. A computer system for reducing transmission of probe car data, the computer system comprising:
one or more computer processors, one or more computer readable storage media, and program instructions stored on the computer readable storage media for execution by at least one of the one or more processors, the program instructions comprising:
program instructions to receive a first set of probe car data for the vehicle over a network, wherein the first set of probe car data comprises a trigger event from a first time;
program instructions to determine that no additional set of probe car data is received during a second time interval;
program instructions to reduce transmission of monitoring signals over the network;
program instructions to assume a non-trigger assumption for the second time interval based on an absence of receiving an additional set of probe car data; and
program instructions to estimate an estimated probe car data for the vehicle at the second time interval based on the first set of probe car data, a configuration of the roadway, and the non-trigger assumption, wherein the estimated probe car data includes a change in heading angle, speed and acceleration that are less than a threshold.

18. The computer system of claim 17, wherein the first set of probe car data comprises a first heading angle and a first speed, and wherein the non-trigger assumption comprises a selection from the group consisting of: a current heading that is within a heading threshold from the first heading and a current speed that is within a speed threshold from the first speed.

19. The computer system of claim 17, comprising:
   program instructions to receive a wave flag and a location of the vehicle at a third time interval, wherein the wave flag comprises an indication of wave-like motion of traffic; and
   program instructions to, in response to receiving the wave flag, determine that a road condition comprises traffic congestion without estimating estimated probe car data for the third time interval.

20. The computer system of claim 17, wherein estimating the estimated probe car data for the vehicle at the second time interval comprises:
   program instructions to calculate an estimated distance traveled by the vehicle since the first time interval;
   program instructions to calculate an estimated heading range of the vehicle, wherein the heading range comprises a current heading plus or minus a heading threshold within which the vehicle will not trigger a trigger event; and
   program instructions to compare the estimated distance traveled and the estimated heading range to map data stored on a remote server.

* * * * *